United States Patent [19]

Masuda et al.

[11] Patent Number: 4,846,390
[45] Date of Patent: Jul. 11, 1989

[54] AUTOMATIC SOLDERING APPARATUS

[75] Inventors: Tsugunori Masuda; Shinsaku Kuranari; Yu Fukuhara, all of Saitama, Japan

[73] Assignee: Kabushiki Kaisha Tamura Seisakusho, Tokyo, Japan

[21] Appl. No.: 201,901

[22] Filed: Jun. 3, 1988

Related U.S. Application Data

[62] Division of Ser. No. 87,675, Aug. 20, 1987, Pat. No. 4,787,550.

[30] Foreign Application Priority Data

Dec. 3, 1986 [JP] Japan ................... 61-288490

[51] Int. Cl.[4] .............................................. B23K 37/00
[52] U.S. Cl. ....................................... 228/47; 118/423; 118/503; 269/903; 414/404
[58] Field of Search .......................... 228/37, 43, 47; 118/423, 503; 269/903; 427/431, 433; 414/404

[56] References Cited

U.S. PATENT DOCUMENTS

| | | | |
|---|---|---|---|
| 4,408,560 | 10/1983 | Caratsch | 228/47 |
| 4,512,510 | 4/1985 | Kondo | 228/43 |
| 4,747,532 | 5/1988 | Sim | 228/47 |

FOREIGN PATENT DOCUMENTS

| | | | |
|---|---|---|---|
| 59054 | 5/1976 | Japan | 228/47 |
| 168668 | 7/1987 | Japan | 228/47 |

Primary Examiner—Nicholas P. Godici
Assistant Examiner—Samuel M. Heinrich
Attorney, Agent, or Firm—James E. Nilles

[57] ABSTRACT

An automatic soldering apparatus wherein a fixture is conveyed sequentially and endlessly by an elevation mechanism of a loading unit, soldering conveyors of a plurality of units that relate to the soldering operation, an elevation mechanism of an unloading unit, and return conveyors of units relating to the soldering operation; works are automatically fitted to the fixture by the loading unit, and while the fixture is being conveyed by the soldering conveyor of each of the units which relate to the soldering operation and are combined with one another suitably, whenever necessary, the soldering operation of the works and other operations associated therewith are carried out; and the unloading unit automatically recovers the works from the fixture and the empty fixture is returned to the loading unit by the return conveyors of the units relating to the soldering operation so that the works are again fitted to the fixture by the loading unit. The units relating to the soldering operation are partially removed, replaced or added, whenever necessary.

6 Claims, 12 Drawing Sheets

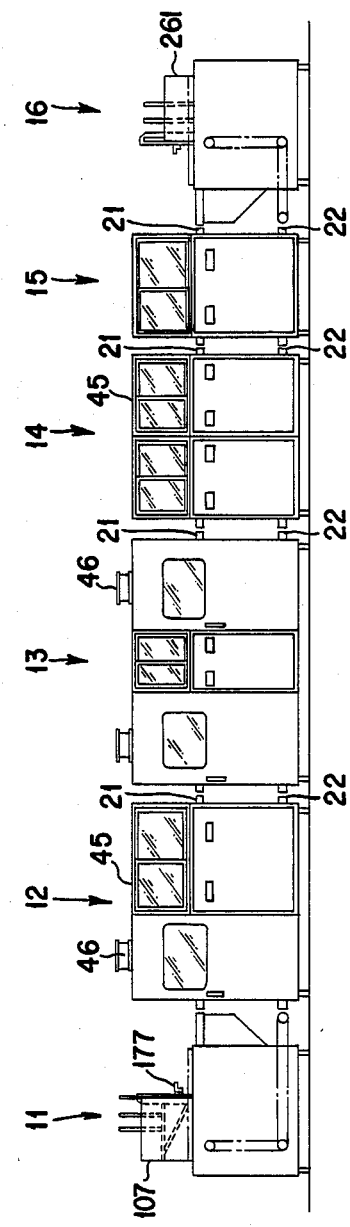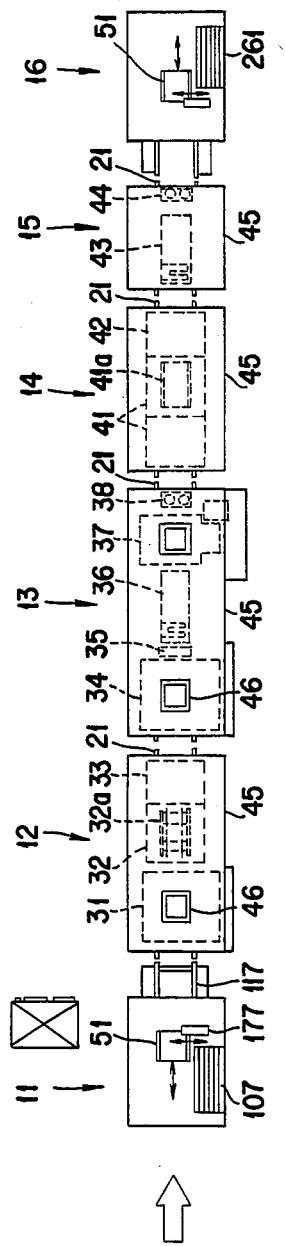

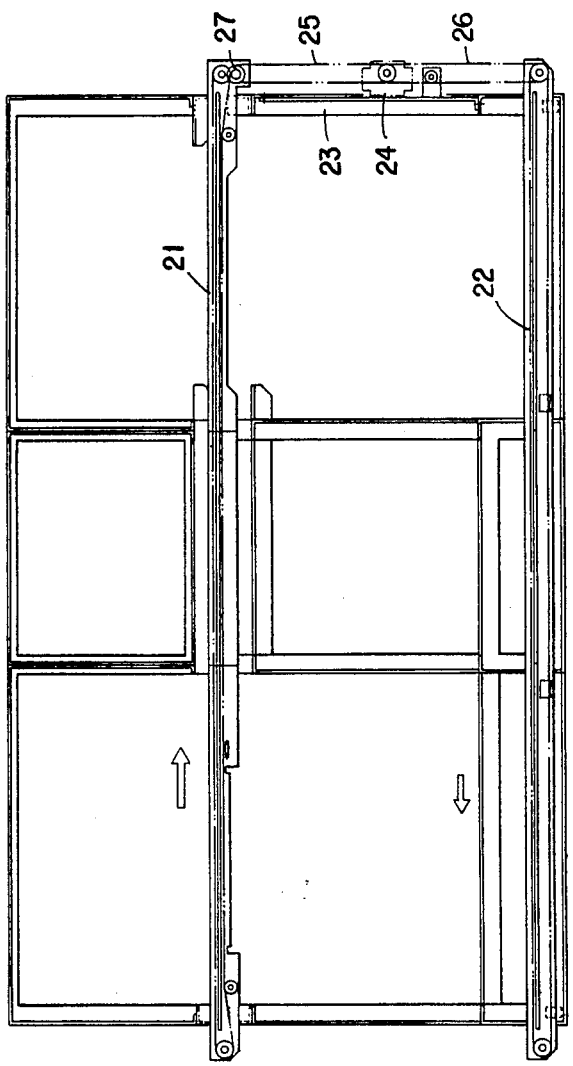

F I G. 4
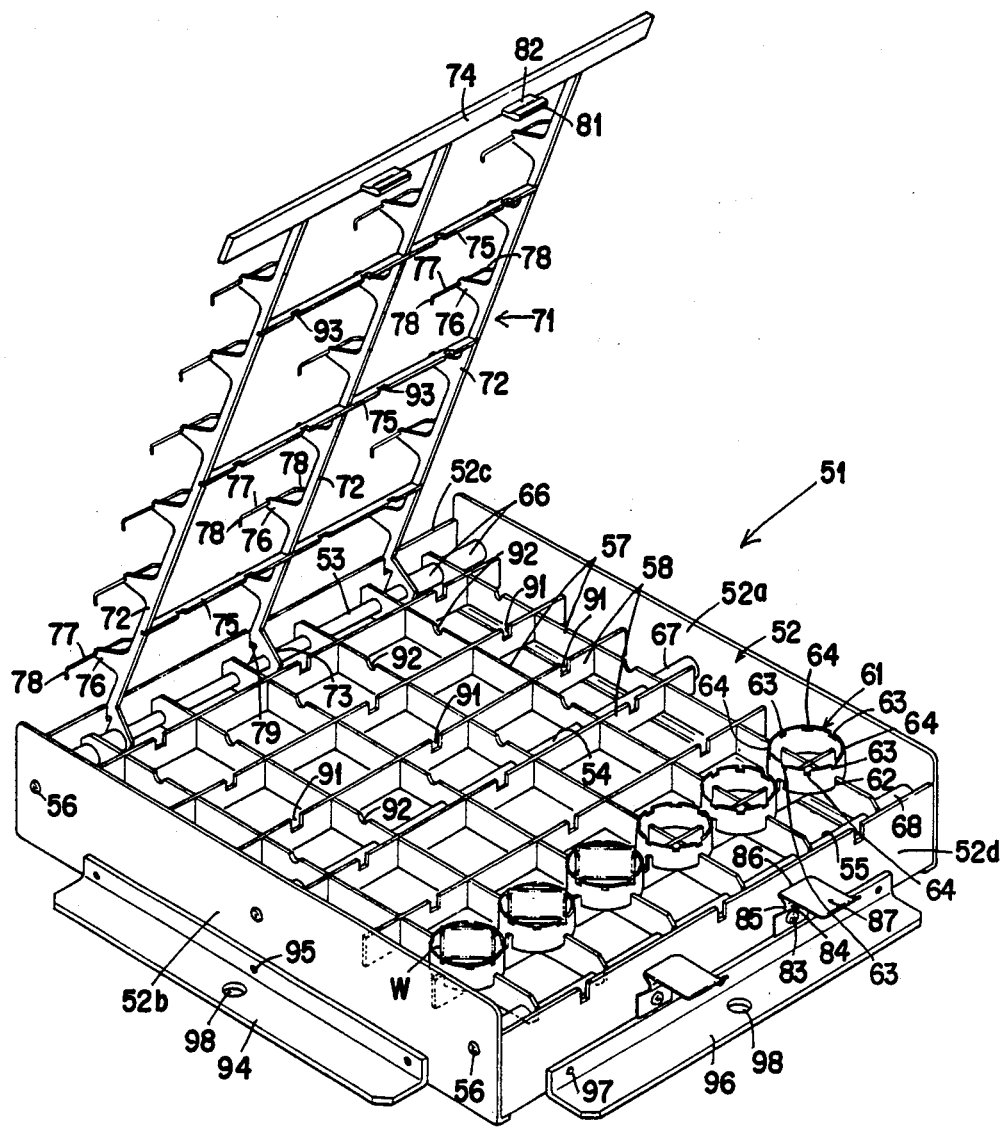

AUTOMATIC SOLDERING APPARATUS

This application is a continuation, of application Ser. No. 087,675, filed 8/20/87, now U.S. Pat. No. 4,787,550.

BACKGROUND OF THE INVENTION

1. Field of the Invention

This invention relates to an automatic soldering apparatus.

2. Description of the Prior Art

In order to form a solder film on each lead of an integrated circuit device (hereinafter called a "work"), typical prior art technique such as one disclosed in Japanese Patent Publication No. 57269/1983 employs the steps of fitting a large number of works to a fixture, supplying this fixture to an automatic soldering apparatus and soldering automatically the leads.

In the conventional automatic soldering apparatus of the prior art reference described above, an endless conveyor for conveying the fixture is disposed, and various equipments such as a pre-treating tank for removing contamination of the works, a fluxer for putting a flux to the works, a pre-heater for pre-heating the works, a solder tank for jetting a molten solder to the leads, a washing tank for removing the remaining flux, a drying heater for drying the washing liquid, and so forth, are arranged sequentially along the endless conveyor.

Among the various equipments used for soldering described above, some must be replaced from time to time by others or be entirely removed depending upon types of works to be soldered.

When many equipments are disposed along the endless conveyor for soldering as described above, however, it is not possible to replace or remove some of them.

Next, the conventional fixture will be explained. As described in Japanese Patent Publication No. 57269/1983 described above, a soldering fixture for aligning and supporting a large number of integrated circuit devices (hereinafter called "works") has been used in the past in order to solder their leads.

In the known fixture of the type described above, a lower support line member and an upper support line member are disposed inside the same frame and a large number of works are continuously slid and inserted between both support line members from an insertion port defined on the frame, and after a gate member formed at the insertion port is closed, the fixture is fitted to a conveyor holder of the soldering line.

The known fixture described above is suitable for the works of the type which have leads on two faces of an IC package such as dual in-line package type IC, and the leads on both sides of the work are put and slid on the lower support line member in such a manner as to bridge the lower support line member.

However, a flat package type IC which has gained an increasing application recently as a surface mount type IC for a printed circuit board and in which leads are disposed on four faces of the IC package cannot be fitted to the known fixture described above because the leads disposed in the longitudinal direction interfere with the lower support line member at the time of insertion.

Japanese Patent Application No. 289019/1985 (hereinafter called the "application A") therefore discloses a fixture for soldering the leads of the four-face lead type IC. As disclosed in the specification and drawings of this prior art reference, at least one pair of lower support members are disposed in parallel with each other with a gap between them inside an outer frame, a recess is formed on the upper surface of each lower support member in a direction orthogonal to the gap, fitting grooves into which four corners of the IC package are to be fitted are defined at the four crossing points between the gap and the recesses, an inner frame is removably inserted from above into the outer frame, and upper anchor members for anchoring the upper surface of the IC package fitted to the lower support members are disposed inside the inner frame along the lower support members. Another fixture is disclosed in Japanese Patent Application No. 145670/1986 (hereinafter called the "application B"). As disclosed in the specification and drawings of this prior art reference, this fixture has a construction wherein receiving members are disposed inside an outer frame, projections for supporting the lower surface of the IC package are integrally molded with the upper side of the receiving members, support members are removably fitted from above into the outer frame, and recesses that fit to the upper part of the IC package placed on the projections are formed on the support members.

In the fixture of the application A, the inner frame is fitted into the outer frame into which the works have been already fitted, by gripping the handle disposed in the inner frame, while in the fixture of the application B, the support member is fitted into the outer frame by gripping the handle disposed on the support member. In either case, the work fixing member disposed at the upper part of the work is gripped by hand and inserted into the outer frame, but this fitting work is based on the premise that accurate locating work is made between the outer frame and the work fixing member, and this is a problem to be solved in order to accomplish automatic soldering.

Thirdly, an automatic work feeding and discharging apparatus for automatically feeding and discharging the works to and from the fixture conveyed endlessly in the automatic soldering apparatus will be explained. As described in Japanese Patent Publication No. 57269/1983 mentioned already, a conventional method comprises transferring the works from a work case (work storage tube) to the fixture by use of a seesaw type work transfer device outside the automatic soldering apparatus, removing then the fixture from the work transfer device, fitting the fixture from above to a conveyor holder constituting the conveyor line of the automatic soldering apparatus and soldering the leads of the works while conveying the fixture together with the conveyor holder.

Moreover, since the work transfer device described above transfers the works from the work case to the fixture by a slide system, its application is limited to integrated circuit devices (ICs) of a dual in-line type but not to a surface mount type IC such as a flat package type IC in which leads extend from the entire periphery of the IC package, for example.

As described above, it has been customary to individually supply the fixture having the works fitted thereto to the conveyor line of the automatic soldering apparatus through a manual operation of workers. Therefore, the conventional system is not free from the problems in that the load to workers is great and the system cannot be changed from the work fitting system for the fixture to the surface mount type ICs.

SUMMARY OF THE INVENTION

In order to solve the problems of the prior art described above, it is a first object of the present invention to provide an automatic soldering apparatus which can select the combination of arbitrary units by dividing the automatic soldering line into a plurality of units and providing each unit with a fixture conveying function, and which can cope with the production of many kinds of ICs in limited quantities.

It is a second object of the present invention to provide a fixture for automatic soldering which can cope with automation of fitting and recovery operations of the works.

It is a third object of the present invention to provide a system which can automatically fit and recover works such as a surface mount type integrated circuit devices to and from a fixture that is endlessly conveyed in an automatic soldering apparatus.

An automatic soldering apparatus for automatically soldering a plurality of works that are fitted to a fixture and conveyed by a conveyor of the present invention comprises a loading unit for fitting works to a fixture; a plurality of units relating to soldering operation; and an unloading unit for removing the works from the fixture; wherein each of the units is disposed sequentially and separately; each of the units which relate to the soldering operation is equipped with a soldering conveyor for conveying the fixture to which the works are fitted, at its upper portion on the same level and with a return conveyor for conveying the fixture from which the works are removed, at its lower portion on the same level; the loading unit is equipped with an elevation mechanism for moving up the fixture from the level of the return conveyor to the level of the soldering conveyor; and the unloading unit is equipped with an elevation mechanism for lowering the fixture from the level of the soldering conveyor to the level of the return conveyor.

In accordance with the present invention, the fixture is conveyed sequentially and endlessly by the elevation mechanism of the loading unit, the soldering conveyors of a plurality of units that relate to the soldering operation, the elevation mechanism of the unloading unit, and the return conveyors of the units relating to the soldering operation. The works are automatically fitted to the fixture by the loading unit, and while the fixture is being conveyed by the soldering conveyor of each of the units which relate to the soldering operation and are combined with one another suitably, whenever necessary, the soldering operation of the works and other operations associated therewith are carried out. Finally, the unloading unit automatically recovers the works W from the fixture and the empty fixture is returned to the loading unit by the return conveyors of the units relating to the soldering operation so that the works are again fitted to the fixture by the loading unit. The units relating to the soldering operation are partially removed, replaced or added, whenever necessary.

In an automatic soldering apparatus for soldering a plurality of works while the works are being kept planewise by a fixture conveyed on an automatic soldering line, the automatic soldering apparatus in accordance with the present invention of the present application is characterized in that a grid is formed inside an outer frame of said fixture; work receiving beds are formed integrally at crossing portions of the grid in such a manner as to be positioned above the works at the time of soldering; a work support frame is disposed on the outer frame in such a manner as to be positioned below the grid at the time of soldering and to be capable of being opened and closed with a hinge on one side of the outer frame being the center; work support metals are disposed on the work support frame in such a manner as to support and fix from below the works fitted to the work receiving beds at the time of soldering; and engagement means capable of engaging and disengaging with and from one another are disposed on the opposite side of the outer frame to the hinge and at corresponding portions of the work support frame.

The fixture in accordance with this present invention is turned upside down at the time of fitting of the works with its state at the time of soldering being the reference, the works are fitted to the work receiving beds positioned on the grid inside the outer frame, the work support frame is then closed from above with the hinge being the support point, and the work support metal pushes and fixes the upper surface of the works. This closed state of the support frame to the outer frame is maintained by the engagement between engagement members. The outer frame is turned upside down at the time of soldering, and the works are transferred while being pushed from below to the work receiving beds thereabove by the support metals.

In an automatic soldering apparatus for automatically soldering a plurality of works fitted to a fixture while being conveyed by a soldering conveyor, the present invention includes a loading unit for fitting the works to the fixture; a soldering conveyor described above, for conveying the fixture to which the works are fitted; an unloading unit for removing the works from the fixture; and a return conveyor for conveying the fixture from which the works are removed; each of the members described above being disposed endlessly; wherein a plurality of work receiving beds are disposed integrally on a grid inside an outer frame of the fixture; a work support frame is disposed on the outer frame in such a manner as to be capable of being opened and closed with a hinge as an integral part on one side of the outer frame being the center; the fixture is turned upside down at the time of fitting and remove of the works with its state at the time of soldering being the reference; the work support frame is positioned above the work receiving beds positioned above the grid inside the outer frame which is reversed downward and is opened upward; and the loading unit consists of a fixture support bed onto which the fixture carried in from the return conveyor is transferred, a support frame opening/closing mechanism for opening and closing the work support frame of the fixture which is located onto the fixture support bed, a work case supply mechanism for taking out the individual works from a work case storing therein continuously a large number of works to a work supply position, a work transfer mechanism for transferring the works to the work receiving beds of the fixture whose work support frame is opened, from the work supply position by work adsorption nozzles, and a fixture reversing mechanims for turning upside down the fixture whose work support frame is closed by the support frame opening/closing mechanism and supplying it to the soldering conveyor.

In this invention, the fixture which becomes empty at the unloading unit is located onto the fixture support bed of the loading unit through the return conveyor, and the work support frame of the fixture is opened by the support frame opening/closing mechanism. Then, the works which are picked up from the work supply position of the work supply mechanism by the work adsorption nozzles of the work transfer mechanism are transferred to the work receiving beds of the fixture and the work support frame of the fixture is closed by the support frame opening/closing mechanism, so that the works are fixed. This fixture is reversed by the reversing mechanism in such a fashion that the work are positioned downside, and is transferred to the soldering conveyor. Soldering of the leads of the works is made on the soldering line. Finally, the unloading unit recovers the works from the fixture, and the empty fixture is returned to the loading unit through the return conveyor.

These and other objects and novel features of the present invention will become more apparent from the following detailed description when taken in conjunction with the accompanying drawings.

BRIEF DESCRIPTION OF THE DRAWINGS

FIG. 1 is a front view showing an automatic soldering apparatus in accordance with one embodiment of the present invention;

FIG. 2 is a plan view of FIG. 1;

FIG. 3 is a system diagram of a conveyor chain of a soldering unit of the apparatus shown in FIG. 1;

FIG. 4 is a perspective view of a fixture which is inverted vertically at the time of fitting and removable of works;

DESCRIPTION OF THE PREFERRED EMBODIMENTS

Figure 5:
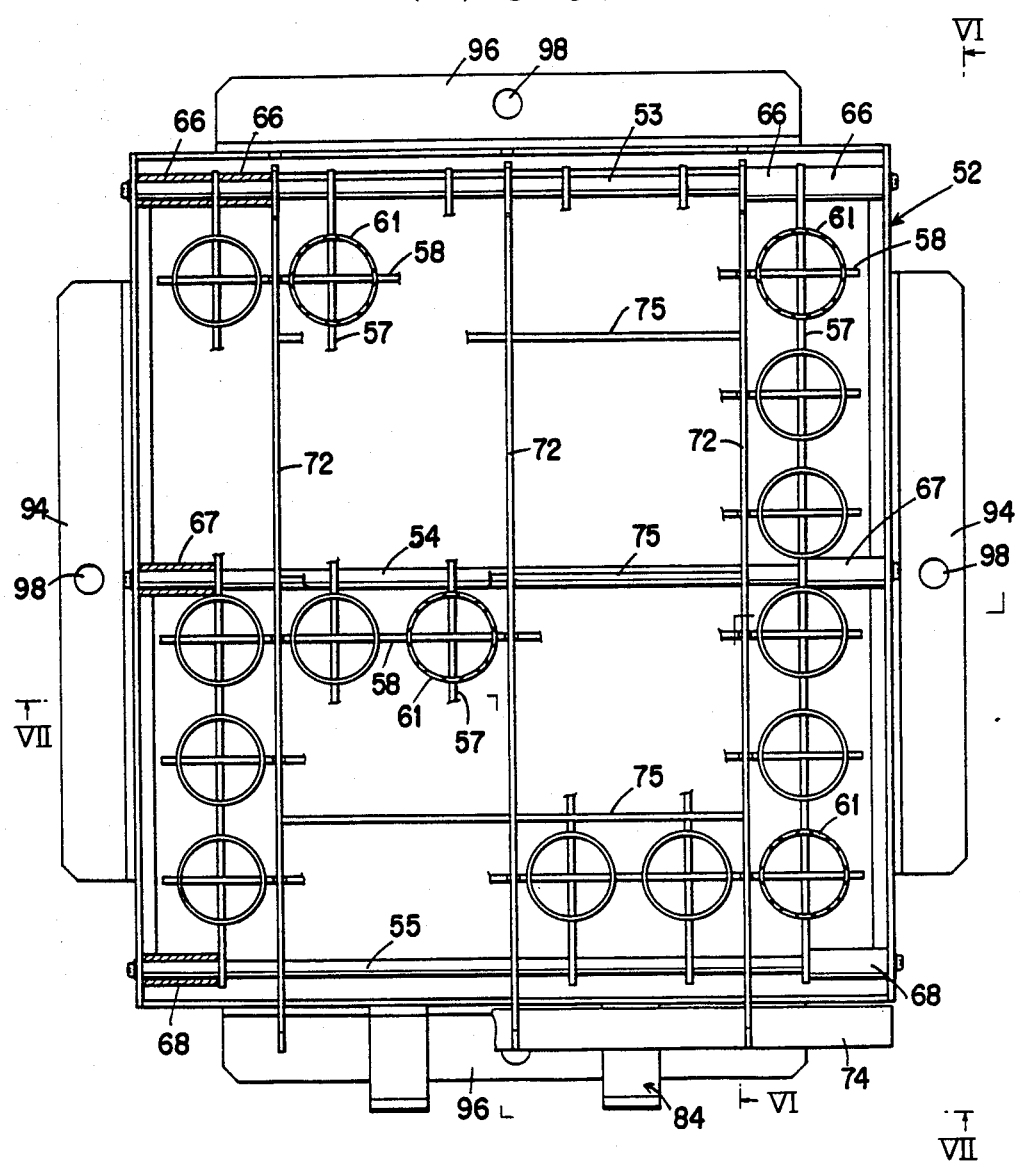
FIG. 5 is a plan view of FIG. 4.

FIGS. 1 and 2 of the accompanying drawings show the automatic soldering apparatus in accordance with the present invention as a whole. As shown in these drawings, the apparatus comprises a loading unit 11 in which works W (see FIGS. 8 and 9) are loaded to a fixture 51 (see FIG. 4), a plurality of units for soldering, that is, a pre-treating unit 12, a soldering unit 13, a washing unit 14 and a drying unit 15, and an unloading unit 16 in which the works W are recovered from the fixture 51 that are disposed sequentially.

Each of the units 11 to 16 described above is disposed separately, and the units 12 to 15 for soldering are equipped with soldering conveyors 21 at their upper part on the same level in order to convey the fixture 51 (see FIG. 10) to which the works W are fitted, and with return conveyors 22 at their lower part on the same level in order to convey the fixture from which the works are removed.

Figure 10:
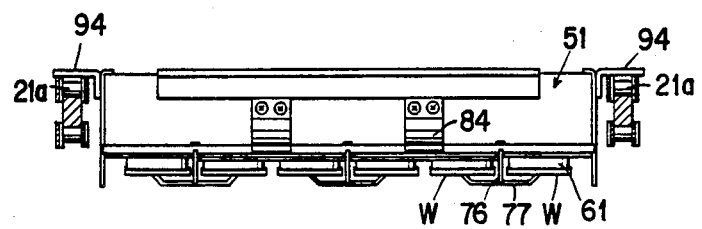
FIG. 10 is a sectional view of a soldering conveyor for conveying the fixture.

FIG. 3 shows the soldering conveyor 21 and return conveyor 22 of the soldering unit 13 described above by way of example. As shown in FIG. 10, these conveyors 21, 22 are free conveyors consisting of a pair of endless chain, and the fixture 51 placed between the pair of chains can be anchored by a stopper, not shown, disposed in each unit 12–15 during the movement of the chains. In FIG. 3, the revolution of a common motor 24 fitted to the frame 23 is transmitted to driving sprockets of the conveyors 21, 22 through revolution transmission mechanisms 25, 26 consisting of the upper and lower chains. A pair of gears 27 for reversing the rotating direction are fitted at an intermediate part of the revolution transmission path to the upper soldering conveyor 21 in order to convey the fixture to the right in comparison with the lower return conveyor 22 which conveys the fixture to the left in the drawing.

As shown in FIG. 2, the pre-treating unit 12 is disposed in order to wash off any contamination of the work, and is integrally equipped with a pre-cleaning bath 31 for washing the work by cleansing liquid, a prerinsing bath 32 and a shower 32a for washing the work by hot or cold water and an air blower 33 for blowing off the cleansing liquid attaching to the work. The soldering unit 13 is equipped integrally with a jet type fluxer 34 for spraying flux to the work, an air knife 35 for removing the excessive flux attaching to the work by air, a pre-heater 36 for pre-heating the work, a jet type soldering bath 37 for supplying the jet solder to the work and a cooling fan 38. The washing unit 14 is disposed in order to receive any flux attaching to the work W and the fixture 51, and is equipped integrally with a post-rinsing bath 41 and a shower 41a for washing the work and the like by hot or cold water and an air blower 42 for blowing off the washing liquid by air. Furthermore, the drying unit 15 is used to completely dry the work and the like after washing and is equipped integrally with a drying heater 43 and a cooling fan 44. These units 12, 13, 14 and 15 are covered with respective hoods 45, and exhaust ducts 46 are disposed on the hoods 45 of the pre-treating unit 12 and soldering unit 13.

The automatic soldering line consisting of these many split type units 11 - 16 can be disposed in an L-shaped or U-shaped layout, as viewed on the plan, by disposing the conveyors for converting the conveying direction of the fixture between the units. It is also possible to manually put the fixture before an arbitrary unit.

Next, FIGS. 4 through 11 show the fixture 51 for soldering.

FIG. 4 shows the fixture 51 under the state where the works are fitted and recovered. This is a reversed state in comparison with the state at the time of soldering. This fixture has the following construction. Namely, three support rods 53, 54, 55 are spread inside a square outer frame 52 in such a manner as to extend from one side plate 52a of the outer frame to the other plate 52b and are fixed by screws 56, respectively. Six longitudinal plates 57 are equidistantly fitted to each support rod and six transverse plates 58 are equidistanly combined with these longitudinal plates 57. Each of these longitudinal and transverse plates 57 and 58 has a half notch groove on its combination side and when these notch grooves are mutually fitted, a grid is defined by these plates.

A work receiving bed 61 is fitted to all the crossing portions of the grid between the longitudinal plates 57 and the transverse plates 58 with the crossing portion being the center, and is welded thereto. Each work receiving bed 61 is formed by cutting a round pipe in a predetermined length and its notch grooves 62 are fitted and welded to the longitudinal and transverse plates 57, 58 from the side of the grid. Four work fitting grooves 63 having the same direction are disposed at 45° on the round pipe on the opposite side to the notch grooves 62 and four other work fitting grooves 64 are disposed at 45° between the former grooves 63, respectively. As represented by solid line in FIG. 8, the four corners of each work W is fitted to the work fitting grooves 63 and each corner of the work W is fitted to the work fitting groove 64 as represented by two-dot chain line in FIG. 8.

Figure 9:
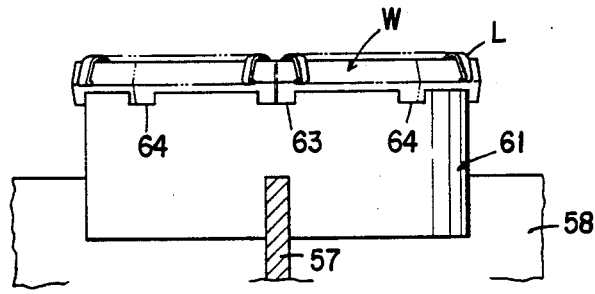
FIG. 9 is a side view of FIG. 8.

This work W is a surface mount device (SMD; surface mount type IC) of a flat package type which is called a "plastic leaded chip carrier (PLCC)", and a large number of leads L are disposed on the four sides of the package as shown in FIG. 9. Since the work is fitted with its upper surface facing upward, the leads L are positioned at the upper half of the package and do not come into contact with the work receiving bed 61.

Sleeve-like spacers 66, 67, 68 are fitted to both side portions of the three support rods 53, 54, 55 described above as shown in FIG. 5 in order to locate the grid inside the outer frame 52.

Turning back again to FIG. 4, the support rod 53 serves also as a hinge and a work support frame 71 for fixing the work W on the work receiving bed 61 is disposed on this support rod 53 in such a fashion that it can be opened and closed. This support frame 71 has three longitudinal plates 72 whose base end portions 73 are rotatably fitted to the support rod 53. An opening plate 74 at the tip of the longitudinal plates 72 and three transverse plates 75 at their intermediate portions are welded to the longitudinal plates 72, respectively. Each longitudinal plate 72 is equipped integrally with projections 76 at positions corresponding to the transverse plates 58 that are the integral part of the outer frame 52, and each projection 76 is equipped at its tip with a recess into which a needle-like work support metal 77 is fitted and welded. Work press portions 78 coming into contact with the work W are formed at both ends of this support metal 77 by bending the support metal 77. When rotated to the state represented by two-dot chain line in FIG. 6, the base end 73 of the longitudinal plate 72 of the work support frame 71 is anchored by an anchor groove 79 formed on an outer frame plate 52c.

Two fixed portions 81 are welded to the opening plate 74 of the work support frame 71 in such a manner as to project towards the outer frame 52 and are equipped with fixing plate fitting recesses 82. Support frame fixing plates 84 are fixed by screws 83 to the outer frame plate 52d corresponding to the fixed portions 81, respectively. Each fixing plate 84 functions as a whole as an elastic leaf spring, and consists of a recess 85 into which the fixed portion 81 is fitted, a fixing projection 86 which is forcedly opened in a direction away from the outer frame plate 52d and then fits into the fitting recess 82 due to righting moment of the leaf spring, and a fixing releasing portion 87 which projects horizontally from this projection 86. These members are formed integrally with one another by a single sheet metal.

Figure 6:
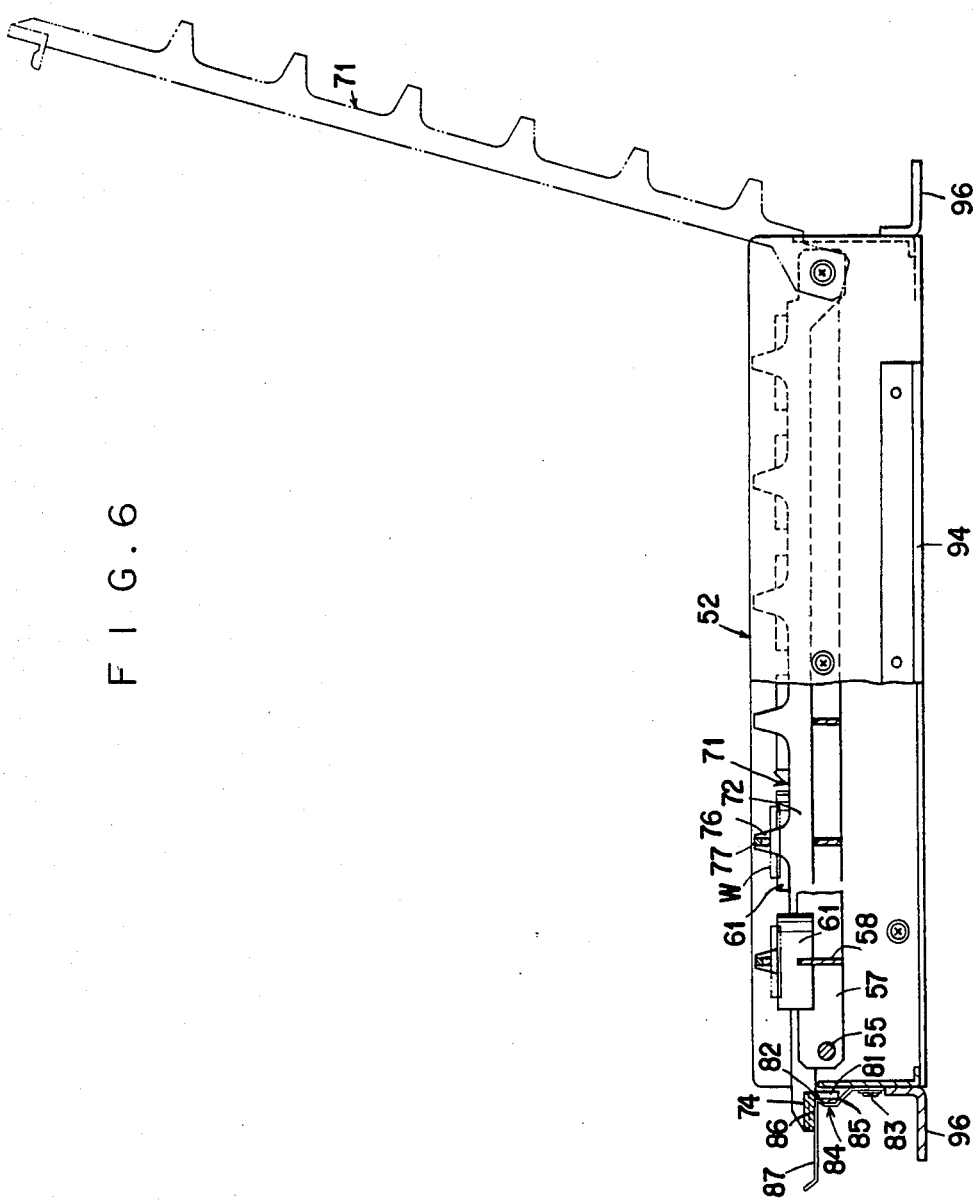
FIG. 6 is a sectional view taken along line VI—VI of FIG. 5.

When the fixed portions 81 are fitted from above into the recesses 85 of the support frame fixing plate 84 as shown in FIG. 6, the inclined portion of each fixing projection 86 which fits into the fitting recess 82 of this fixed portion 81 pushes downward the fixed portion 81 and keeps reliably the closed state of the work support frame 71 with respect to the outer frame 52. When the fixing releasing portions 87 are pushed from above, the support frame fixing plates 84 are moved counter-clockwise in the drawing of FIG. 6 with their portions fixed by the screws 83 being the support point, so that the fixing projections 86 are moved back from the recesses 82 of the fixed portions 81 and fixing of the work support frame 71 is released.

Each transverse plate 58 on the receiving side is equipped with a groove 91 which meshes with the longitudinal plate 72 on the supporting side as shown in FIG. 4, and each longitudinal plate 57 on the receiving side is equipped with a groove 92 which fits with the transverse plate 75 on the supporting side. Each transverse plate 75 on the supporting side is equipped with a groove 93 which meshes with the longitudinal plate 57 on the receiving side.

L-shaped plates 94 are fixed by screws 95 to the outer surface of right and left plates 52a, 52b of the outer frame 52 while L-shaped plates 96 are fixed by screws 97 to front and rear plates 52c, 52d of the outer frame 52. A round hole 98 is bored at the center of each L-shaped plate 94, 96 so as to locate the fixture 51 by a pin when the work is set.

After the works are set, this fixture 51 is turned upside down as shown in FIG. 10 and is supplied to the automatic soldering line and put on the pair of conveyor chains 21a of the soldering line. At this time, its right and left L-shaped plates 94 are slidably meshed with the pair of conveyor chains 21a.

Titanium having high corrosion resistance is used for all the members of this fixture 51 and fixing between these members are made by welding except for the screw-fixing portions.

Figure 7:
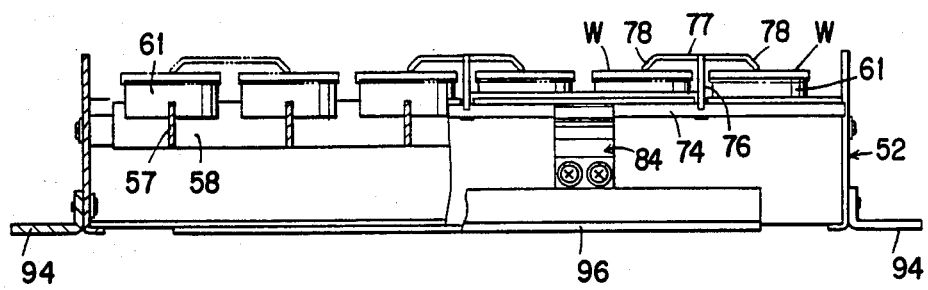
FIG. 7 is a sectional view taken along line VII—VII of FIG. 5.
Figure 8:
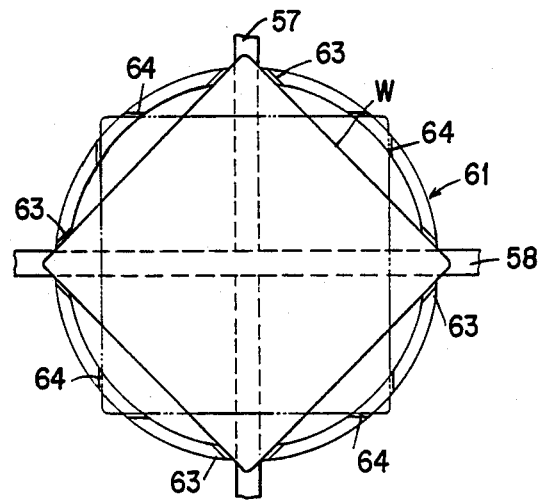
FIG. 8 is a enlarged front view of a work receiving bed of the fixture.
Figure 11:
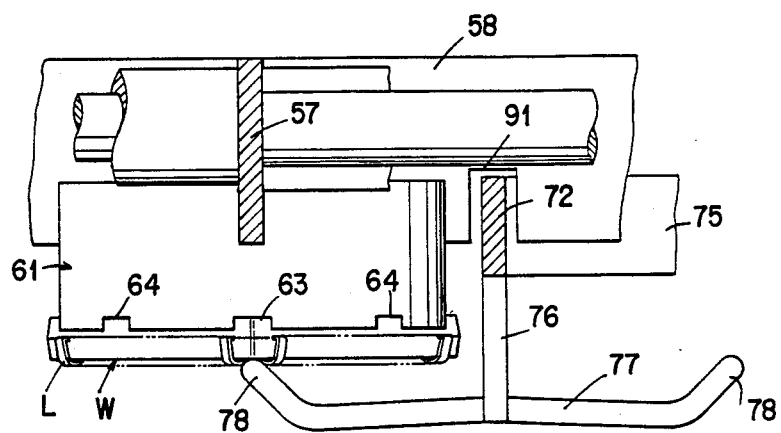
FIG. 11 is an enlarged view showing the work support portion at the time of soldering.

Next, the method of using this fixture 51 will be explained. The outer frame 52 is placed downward at the time of fitting and recovering the works with the work support 71 being positioned upside. This work support frame 71 is opened upward as represented by two-dot chain line in FIG. 6, and the works W are fitted to the work fitting grooves 63 or 64 of the work receiving beds 61 as shown in FIGS. 8 and 9. When the work support frame 71 is closed as represented by solid line in FIG. 6, the press portions 78 at both ends of each work support metal 77 are brought into contact with the center of each work as shown in FIG. 7 and 36 works W in all are simultaneously clamped and fixed. The fixture 51 is then turned upside down so that the works W are positioned downward as shown in FIGS. 10 and 11, and is supplied to the automatic soldering line, where soldering is made for all the leads L and a solder film is formed on the entire surface of each lead L to prevent oxidation.

As described above, this fixture 51 makes it possible to reliably fit each work W to the work receiving bed 61 which is turned down at the time of fitting and removing the work. Since the center of each work W is supported at one point by the tip press portions 78 of each work support metal 77, an obstacle for the molten solder jetted from the nozzle of the solder tank 37 becomes minimal and soldering can be made reliable for all the leads L around the entire periphery of the work W. Since the round pipe material is used as the work receiving bed 61 and the work fitting groove 63 or 64 is formed on this bed 61 in this fixture 51, a large number of work receiving beds 61 can be produced relatively easily and the corners of the work which are not related with soldering can be supported by a limited contact area.

Figure 14:
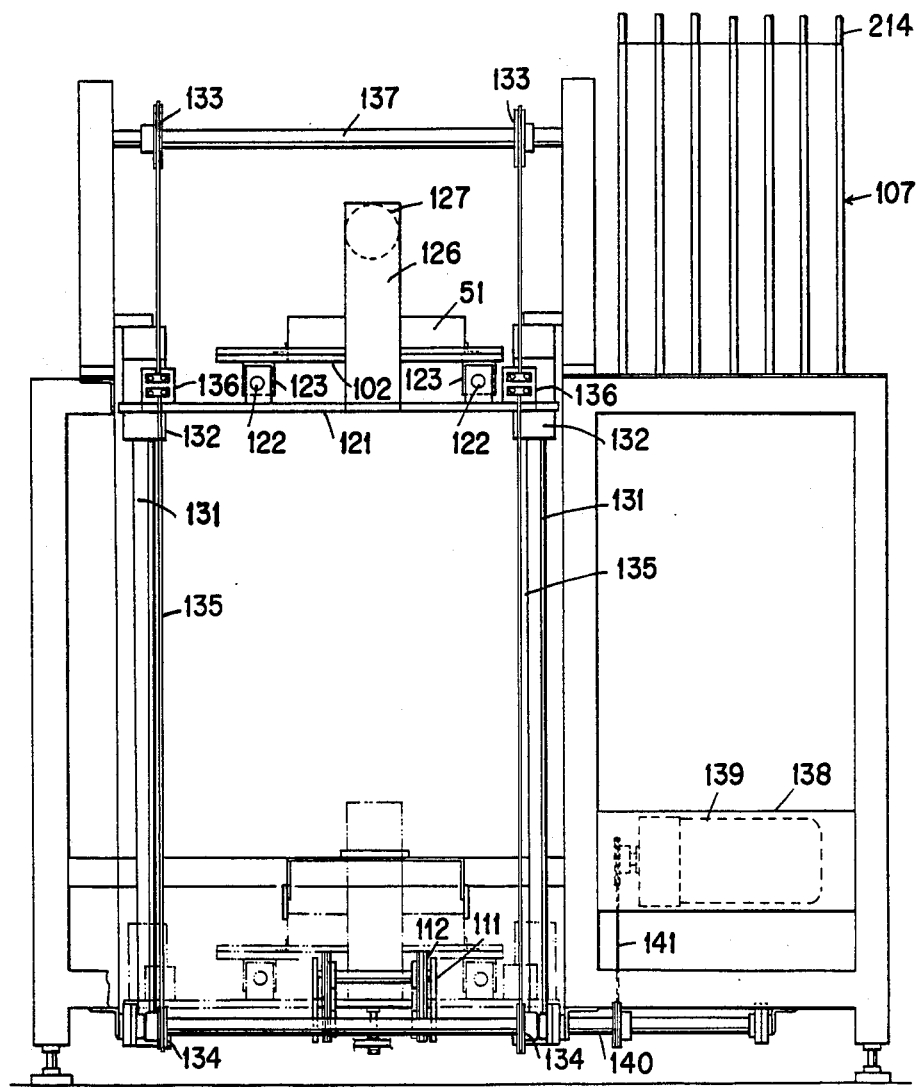
FIG. 14 is a side view of the loading unit.
Figure 15:
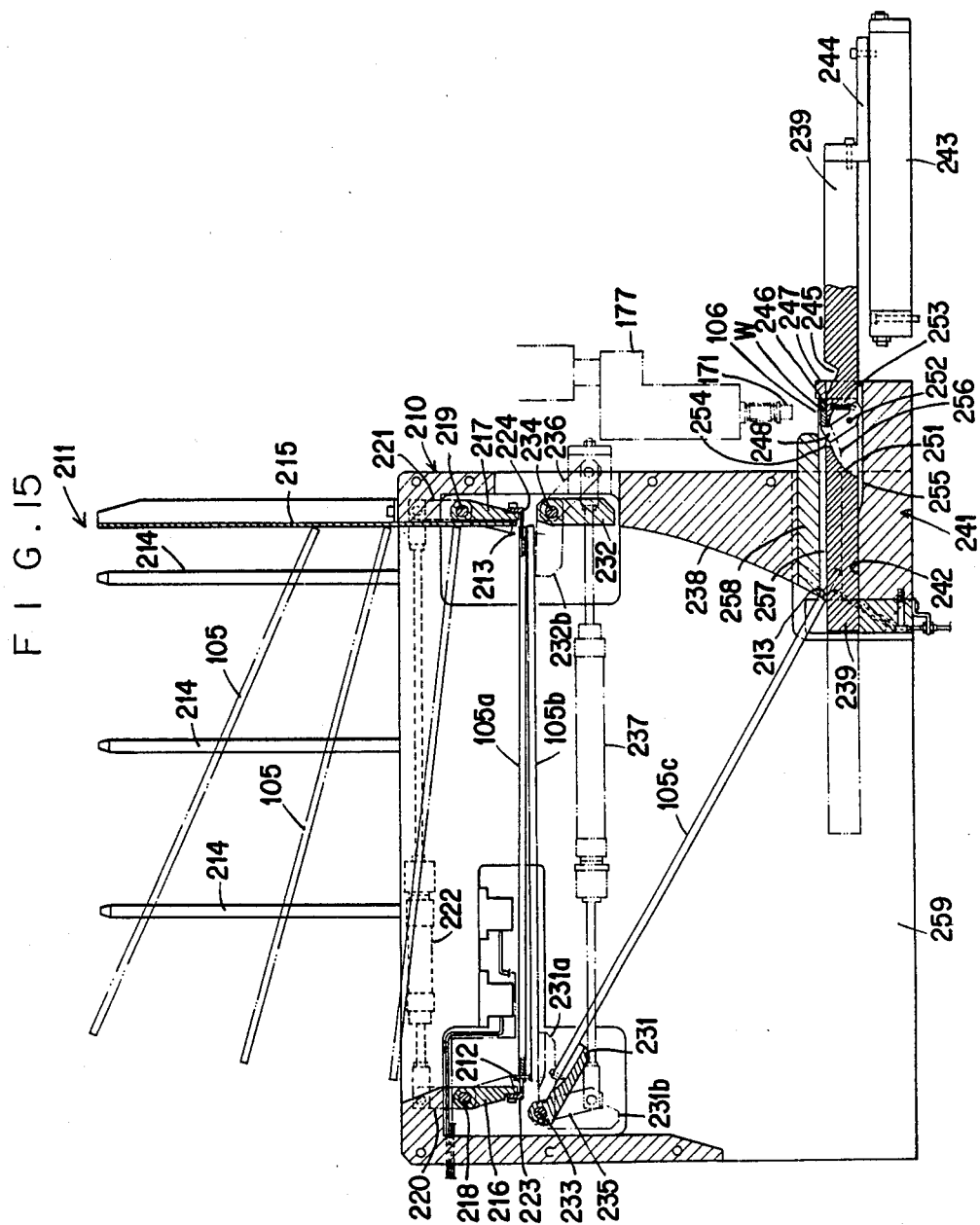
FIG. 15 is a sectional view of a work supply mechanism of the loading unit.
Figure 16:
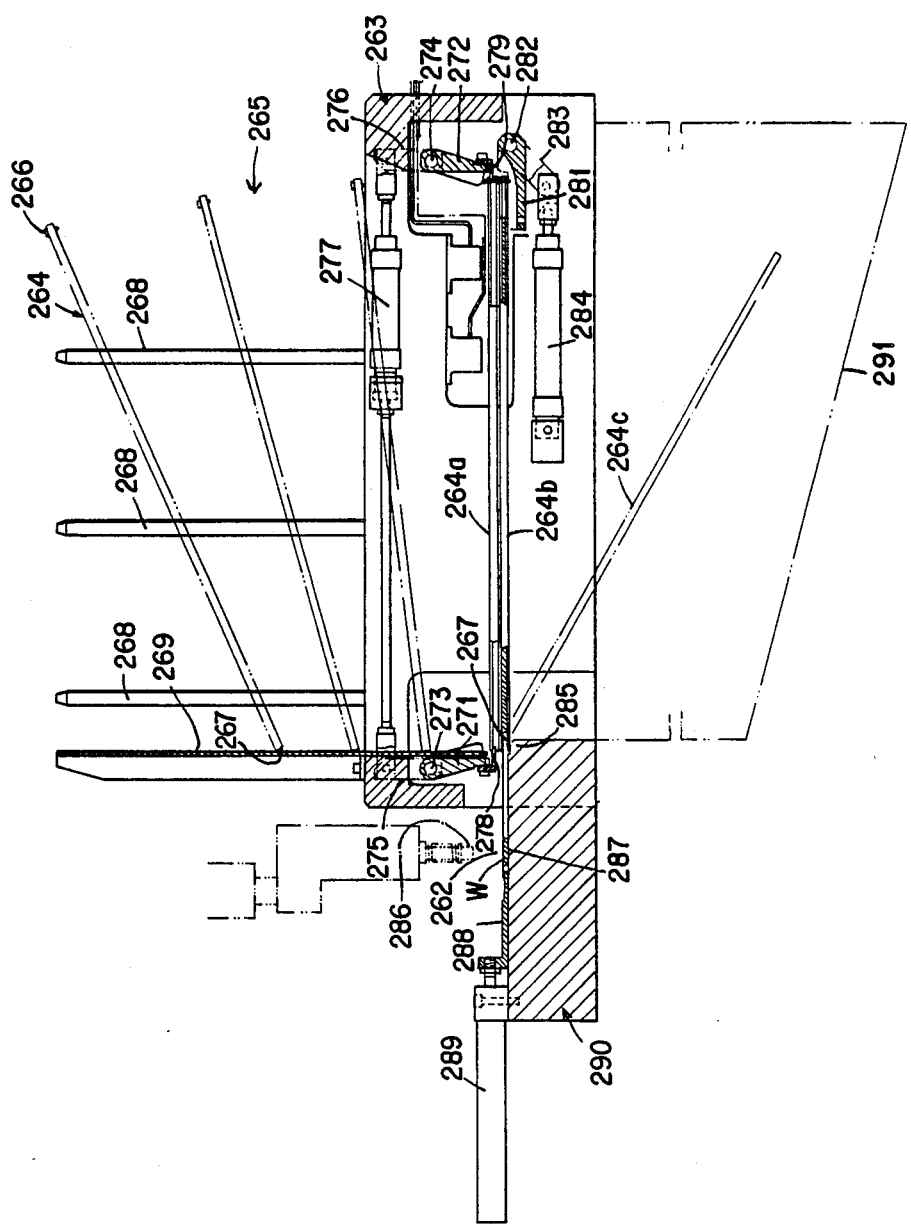
FIG. 16 is a sectional view showing a work recovery mechanism of an unloading unit.

Next, FIGS. 12 to 15 show the entire part, or part, of the loading unit 11 described already, and FIG. 16 shows part of the unloading unit 16. Since this unloading unit 16 is substantially the same as the loading unit, only the different portions will be explained elsewhere.

Figure 12:
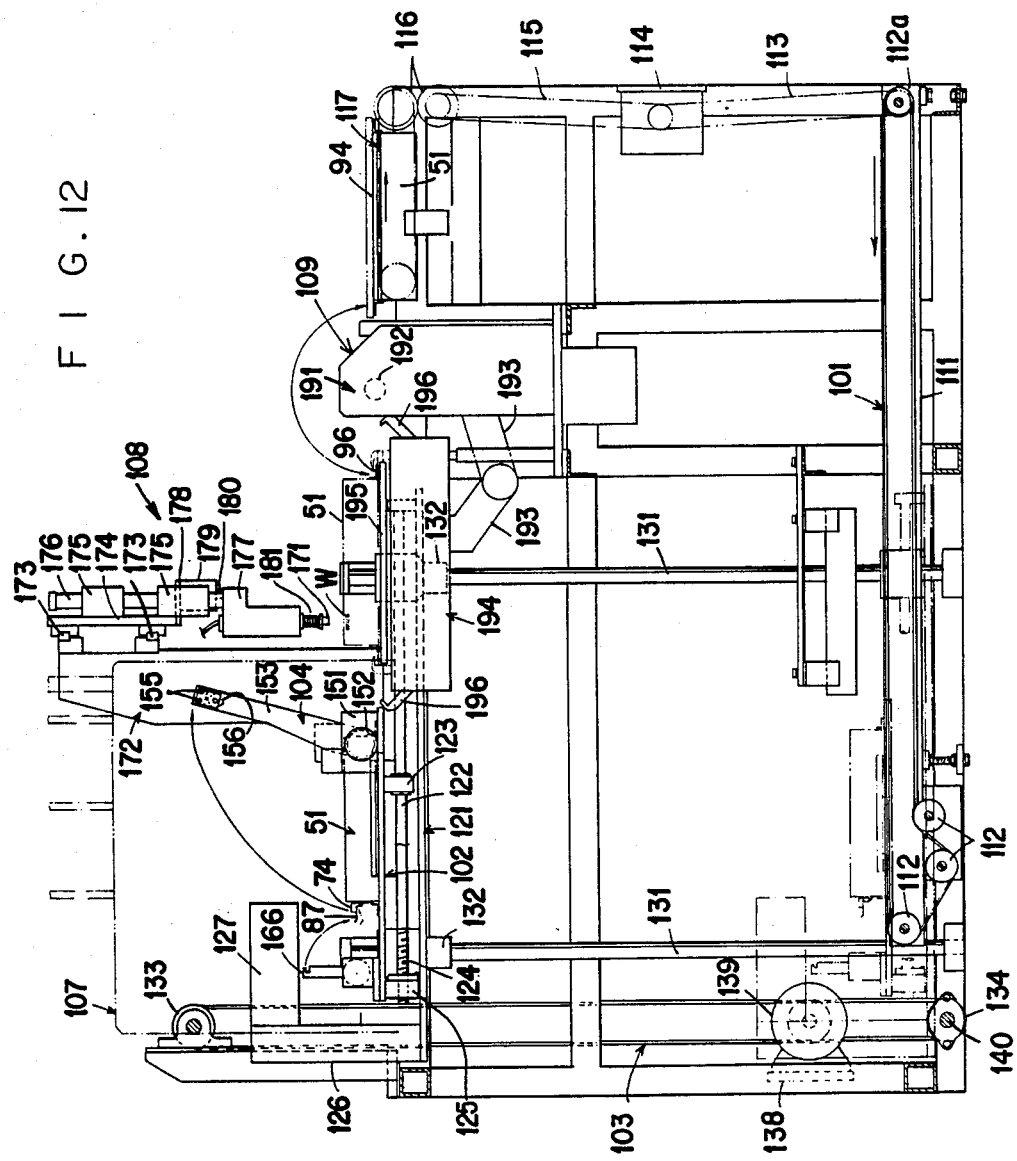
FIG. 12 is a front view of a loading unit.

As shown in FIG. 12, the loading unit 11 consists of a fixture support bed 102 on which the fixture 51 conveyed from the return conveyor 22 of the pre-treating unit 12 through the take-in conveyor 101 is placed; an elevation mechanism 103 for moving up and down this support bed 102; a support frame opening/closing mechanism 104 for opening and closing the work support frame 71 of the fixture 51 located onto the support bed 102; a work supply mechanism 107 for withdrawing individual works W from a work case (see FIG. 15) for continuously storing therein a large number of works W to a work supply position 106 (see FIG. 15); a work transfer mechanism 108 for transferring the works W on the work receiving beds 61 of the fixture 51 whose work support frame 71 has been opened; and a fixture reversing mechanism 109 for turning upside down the fixture 51 whose work support frame 71 has been closed by the support frame opening/closing mechanism 104 and supplying the fixture to the soldering conveyor 21 of the pre-treating unit 12.

The take-in conveyor 101 consists of a pair of round belts that are extended endlessly on pulleys 112 pivotally supported to the conveyor frame 111, and a pulley 112a at one of the ends of this conveyor 101 is driven by a speed control motor 114 through a revolution transmission mechanism 113. This motor 114 drives a fixture take-out conveyor 117, too, that is disposed at the upper part of the unit frame, through a revolution transmission mechanism 115 and a pair of gears 116 for reversing the rotating direction. Whereas the take-in conveyor 101 support the L-shaped plates 96 on the front and rear side of the fixture as shown in FIG. 13 in the same way as the return conveyor 22, the take-out conveyor 117 supports and transfers the L-shaped plates 94 on the right and left sides of the fixture 51 in the same way as the soldering conveyor 21.

Figure 13:
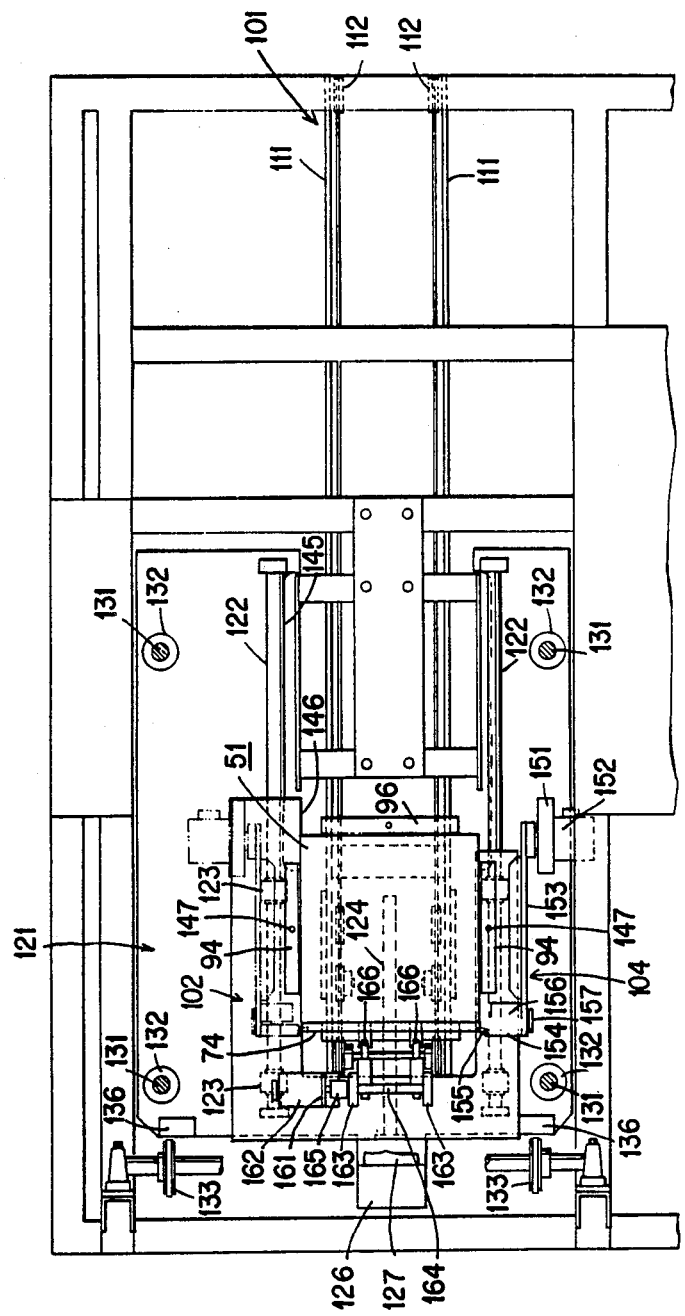
FIG. 13 is a plan view showing a fixture support bed and the like on an elevation base of the loading unit.

In the fixture support bed 102 described above, slide portions 123 disposed on the lower surface of the support bed 102 are slidably fitted to the pair of guide rods 122 disposed on the upper surface of the elevation base 121, and a female screw portion 125 on one side of the support bed 102 is meshed with a pitch feed screw 124 disposed between the pair of guide rods 122 as shown in FIGS. 12 to 14. The rotating direction and number of revolution of the feed screw 124 are controlled by an induction motor (which may be either a servo motor or a stepping motor) 127 disposed on the elevation base 121 through a revolution transmitter 126. The motor 127 rotates the feed screw 124 through the timing belt or the like inside the revolution transmitter 126 and pitchfeeds the fixture bed 102 by an interval of said bed 61.

In the elevation mechanism 103 described above, a slide portion 132 of the elevation base 121 is fitted vertically movable to four guide rods 131 that are implanted vertically as shown in FIG. 13, and the elevation base 121 is interconnected to a pair of elevation chains 135 wound endlessly between sprockets 133, 134, that are rotatably supported at the upper and lower portions of the unit frame as shown in FIG. 14, through an interconnecting portion 136. The upper sprocket 133 is fitted to a shaft 137 supported rotatably by a bearing while the lower sprocket 134 is fitted integrally to a driving shaft 140 that is driven by a motor 139 fixed to the unit frame through a fitting plate 138. The normal or reverse revolution of the motor 139 is transmitted by the chains to the driving shaft 140 through the revolution transmission mechanism 141 and as the chain 135 travels, the elevation base 121 and the fixture support bed 102 are moved up and down.

As shown in FIG. 13, recesses 145 and 146 are formed respectively on the elevation base 121 and the fixture support bed 102 in order to prevent interference with the take-in conveyor 101, and the fixture support bed 102 is under the waiting state downstream of the fixture 51 carried in by the conveyor 101 and meshes with the L-shaped plates 94 on the right and left of the fixture at the elevation state. At this time, the pair of locating pins 147 disposed on the support bed 102 fit into the round holes 98 (see FIG. 4) of the right and left L-shaped plates 94, thereby locating the fixture 51.

In the support frame opening/closing mechanism 104, a rotary actuator 152 is disposed on the upper surface of the support bed 102 through a fitting plate 151 as shown in FIGS. 12 and 13. The base end of a rotary arm 153 is fitted to the rotary shaft of this actuator 152, and a pair of pins 155 are disposed at the time of this arm 153 in such a manner as to be capable of moving back and forth with respect to the end portion of the opening/closing operation plate 74 of the fixture. These pins 155 are guided by guide members 154 in a direction at right angles to the arm 153, and interconnected to the piston rod of an air cylinder disposed on the inner side surface of the arm 153, through an interconnecting plate 157.

A mechanism for releasing fixing of the fixture 51 by a support frame fixing plate 84 is further fitted to the support frame opening/closing mechanism 104. In other words, as shown in FIG. 13, another rotary actuator 162 is mounted to the upper surface of the support bed 102 through a fitting plate 161, and a rotary shaft 164 which is supported rotatably by a bearing 163, is connected to the rotary shaft of the actuator 162 through a coupling 165 on the support bed 102. Push portions 166 that correspond to the fixing releasing portions 87 of the pair of support frame fixing plates 84 of the fixture 51 project from the rotary shaft 164, respectively.

When the pair of push portions 166 are rotated downward by the rotary actuator 162, their tips strike the corresponding fixing releasing portions 87 of the fixture 51, push them down and release fixing of the support frame 71 by the fixing plates 84.

When the piston rod of the cylinder 156 is contracted on the premise that the support frame 71 of the fixture 51 is released from the fixed state, the pair of pins 155 are fitted to the upper and lower surface of the opening/closing operation plate 74, and the rotary actuator 152 is actuated under this state to rotate the arm 153. Then, the work support frame 71 of the fixture can be opened and closed. When the piston rod of the air cylinder 156 is pushed out, the pair of pins 155 moves back from the opening/closing operation plate 74.

In the work transfer mechanism 108, six work adsorption nozzles 171 are disposed in such a manner as to correspond to the six lines of work receiving beds 61 of the fixture 51 as shown in FIG. 12 and transfer six works W from the six work supply positions to the six work receiving beds 61 that are pitch-fed and positioned anew. A moving plate 174 is fitted slidably to a pair of transverse movement guide rails 173 disposed on a support portion 172 and two rods 176 are fitted vertically movably to two sets of guide portions 175 that are disposed on the moving plate 174. A nozzle elevation bed 177 is integrally disposed at the lower end of this rod 176 and an air cylinder 179 is disposed at the lower end of the moving plate 174 through a fitting plate 178. The piston rod 180 of this cylinder 179 is connected to the center of the nozzle elevation bed 177. The six work adsorption nozzles 171 described above are fitted vertically movably to this elevation bed 177, and each nozzle 171 is anchored while being pushed down resiliently by a spring 181.

The moving plate 174 is moved in a direction at right angles to the sheet of drawing of FIG. 12 by an air cylinder or ball screw, not shown, disposed between the pair of guide rails 173 so that the six nozzles 171 are moved transversely between the work supply position in front of the work supply mechanism 107 shown in FIG. 14 and the position above the fixture 51 and is moved up and down by an air cylinder 179 at each of these positions and transfer the works W that are picked up by vacuum adsorption from the work supply position 106 shown in FIG. 15 to each work receiving bed 61 of the fixture 51.

In the fixture reversing mechanism 109 described already, a rotary shaft 192 driven by a rotary actuator or the like, not shown, is disposed inside the mechanism main body 191 as shown in FIG. 12, and a clamp main body 194 is disposed at the tip of the arm 193 that is rotated by this rotary shaft 192. A fixture support plate 195 is disposed vertically movably at the upper part of this clamp main body 194 and fixture clamp pawls 196 are rotatably disposed at the front and rear of the clamp main body 194.

As the fixture 51 receives the supply of works W while being pitch-fed by the support bed 102 and reaches the position represented by two-dot chain line in FIG. 12, the support plate 195 is moved up and locating pins, not shown, disposed on this support plate 195 locate the round holes 98 of the front and rear L-shaped plates 96 of the fixture 51 and at the same time, the calmp pawls 196 on both sides are closed so a to fix the L-shaped plates 96. Then, the rotary shaft 192 described above is driven to rotate clockwise the clamp main body 194 by about 180° so that the fixture 51 is transferred while being turned upside down with its L-shaped plates 94 meshing with the pair of endless chains of the take-out conveyor 117 as shown in FIG. 12.

FIG. 15 shows the work supply mechanism 107. A work case stock 211 is disposed at the upper part of its mechanism main body 210 and a large number of work cases (work storage tubes) 105 are stacked in six lines in this stock 211. The left end opening of each work case 105 is closed by a pin 212 while its right opening is left as such to serve as a work take-out port 213. Since the pins 212 of the work cases 105 strike one another, each work case 105 is inclined so that the work take-out port 21 side becomes low. Therefore, a closing plate 215 for closing the work take-out port 213 is disposed vertically at the stock 211 in addition to three each guide rods 214 disposed on both sides of the work case 105. Furthermore, a pair of rotary members 216, 217 are disposed inside the mechanism main body 210 throughout the full length of the work case and are rotatable by shafts 218, 219, which are rotated by an air cylinder 222 through levers 220, 221.

When the air cylinder 222 is extended, the left rotary member 216 is rotated counter-clockwise while the right rotary member 217 is rotated clockwise and anchor pawls 223, 224 disposed at the lower end of the rotary members 216, 217 are inserted into openings on both sides of the work case 105a which is the second from the bottom, and anchor this work case 105a from lowering. When this cylinder 222 is contracted, the rotary members 216, 217 on both sides rotate in the mutually opening direction so that the anchor pawls 223, 224 on both sides come off from the openings at both ends of the work case 105a. Incidentally, the range of rotation of both rotary members 216, 217 is limited by stoppers, not shown, lest one of them rotates too excessively.

Below the pair of rotary members 216, 217 of the work case stock 211 are disposed an anchor portion 231 on one side for anchoring the closed side of the lowermost work case 105b and another anchor portion 232 on the other side for anchoring the take-out side of the work case 105b anchored by the anchor portion 231 on one side. These anchor portions 231 and 232 are rotatably disposed on the mechanism main body 210 by shafts 233 and 234, respectively, and these shafts 233 and 234 are rotated by an air cylinder 237 interposed between and through levers 235 and 236. An arcuate guide surface 238 for guiding the descension of the work take-out port 213 positioned on the opposite side to the work case 105b, that is anchored by the anchor portion 231 on one side, is disposed below the other anchor portion 232 on the other side, and six work extraction members 239 corresponding to the six work cases 105c are disposed horizontally movably at the lower end of this arcuate guide surface 238. Each work extraction member 239 extracts each work W, that drops from the work take-out port 213 of the inclined work case 105c due to descension on one of its sides along the guide surface 238, through its own weight, to the work supply position 106.

The anchor portions 231, 232 on both sides are rotated to their horizontal state 231a, 232a by the contraction of the air cylinder 237 through the levers 235 and 236, respectively, and rotated to their vertical state by the extension of the air cylinder 237. Incidentally, the range of rotation of these anchor portions 231 and 232 to both vertical and horizontal state is limited by stoppers, not shown, but the anchor portion 231 is anchored at a position represented by solid line by a movable stopper which is not shown.

When the rotary members 216 and 217 on both sides open and the anchor pawls 223, 224 on both sides come off from the work case 105a, the anchor portions 231, 232 on both sides are under the horizontally rotated state 231a, 232a and anchor the work case that has dropped to the position represented by reference numeral 105b. At the same time, since another work case drops from above to the position represented by reference numeral 105a, the work case is anchored by the anchor pawls 223 and 224, then the anchor portion 231 is rotated to the inclined position represented by solid line while the other anchor portion 232 is rotated downward as represented by solid line. Therefore, the right end portion of the work case drops along the arcuate guide surface 238 while its left end side is being anchored to the anchor portion 231, and the work is anchored by the work extraction member 239.

The six work extraction members 239 are slidably fitted to six lines of extraction grooves 242 that are formed on a guide portion 241 integrated with the mechanism main body 210, and are interconnected to a slide portion 244 of a straight movement type actuator 243 disposed at a fixed position outside the mechanism. Furthermore, the work extraction members 239 are each equipped with a work fitting groove 245 which has V-shaped cross-section and into which the work W dropping from the work take-out port 213 of the inclined work case 105C; a work receiving surface 246 for supporting horizontally the work W extruded from the work fitting groove 245 with the extracting operation of the work extraction member 239; and a work anchor pawl 248 for locating the work W to the work supply position 106 by clamping the work between it and the work anchor portion 247 which is integral with the guide portion 241 described above. This work anchor pawl 248 is disposed rotatably by a shaft 252 inside a semicircular groove 251 of the work extraction member 239, and urged clockwise by a compression spring 253 and its tip projects upward from a hole 254 bored at the upper part of the semicircular groove 251 above the work receiving surface 246. This work anchor pawl 248 is rotated by a cam surface 255 formed on the surface of the extraction groove 242 of the guide portion 241. The work W that is fitted into the work fitting groove 245 is pushed up to the work receiving surface 246 by work pushup/guide surfaces 256 disposed on both sides of each extraction groove 242 at the stage where it is extracted outward. A work guide 258 is disposed above the work extraction member 239 with a spacing 257 between them.

When the work W that drops one by one from each work extraction port 213 of each of the six lines of work cases 105c is fitted into the work fitting groove 245 that is under the waiting state at the opposite position to each extraction port 213, the actuator 243 is operated and the work extraction member 239 moves to the right. During the former half period of this movement, the lower end of the work anchor pawl 248 is pushed up by the extraction groove surface 242 and the tip of this pawl 248 is contracted below the hole 254. In the latter half period of this movement, however, the work anchor pawl 248 is rotated clockwise by the push force of the spring 253 to the extent corresponding to the descending distance of the cam surface 255, so that the tip of the work anchor pawl 248 projects from the hole 254 and reliably pushes back the work W that is pushed up to the work receiving surface 246 from the work fitting groove 245 by the work pushup/guide surface 56. Finally, this anchor pawl 248 and the anchor portion 247 at the fixed position locate the work W to the work supply position 106. This work W is then picked up by the work adsorption nozzle 171 of the work transfer mechanism 108 described already.

After all the works W have been taken out from the work case 105c in the manner described above, the anchor portion 231 is rotated to the position represented by reference numeral 231b, the empty work case 105c is dropped down and a new work case is supplied to the inclined position 105c in the same way as described above. The empty work case is recovered through a drop port 259.

In the manner described above, the loading unit 11 can automatically fit each work W inside the work case 105 to the fixture 51.

Except for the work recovery mechanism 261 (shown in FIGS. 1 and 2) corresponding to the work supply mechanism 107 of the loading unit 11, the unloading unit 16 is equipped with the conveyor 101, fixture support bed 102, elevation mechanism 103, support frame opening/closing mechanism 104, work transfer mechanism 108 and fixture reversing mechanism 109 of the loading unit 11 in the same way as the loading unit, but these members 101–109 are disposed in the opposite direction to those of the loading unit 11. In this unloading unit 16, the fixture 51 carried in from the soldering conveyor 21 on the fixture support bed 102 is located while being turned upside down by the fixture reversing mechanism, the work support frame 71 positioned above the fixture is opened by the support frame opening/closing mechanism, the work W on the work receiving bed 61 of the fixture 51 is taken out to the work recovery position 262 (see FIG. 16) by the work adsorption nozzle of the work transfer mechanism, the work support frame 71 is closed by the support frame opening/closing mechanism, and thereafter the fixture is lowered to the level of the return conveyor 22 by the elevation mechanism shown in FIG. 1 and transferred to the return conveyor 22 by the take-out conveyor disposed horizontally below the elevation mechanism.

FIG. 16 shows the work recovery mechanism 261 of the unloading unit 16. An empty case stock 265, where a large number of work cases (work storage tubes) 264 are stacked in six lines, is disposed at the upper part of the mechanism main body 263. The opening at the right end of the work case 264 is closed by a pin 266 while the opening at the left end is kept open as such as a work insertion port 267. Since the insertion port side of each work case is stacked and inclined by the pin 266, an anchor plate 269 is implanted vertically for anchoring the work insertion side of the work cases in addition to three guide rods 268 that are disposed on each side of the work case 264 of each line. Furthermore, a pair of rotary members 271 and 272 are rotatably disposed by shafts 273 and 274, respectively, throughout the entire length of the spacing of the work case 264 inside the mechanism main body 263. These shafts 273 and 274 are rotated by an air cylinder 277 through levers 275 and 276, respectively.

When the air cylinder 277 is extended, the left rotary member 271 is rotated counter-clockwise while the right rotary member 272 is rotate clockwise, and anchor pawls 278 and 279 disposed at the lower end of the rotary members 271 and 272 are inserted into openings on both sides of the second work case 264a from the lowermost position and anchor descension of this work case 264a. When the cylinder 277 is contracted, on the other hand, the rotary members 271 and 272 on both sides rotate in the mutually opening direction and the anchor pawls 278 and 279 on both sides come off from the openings at both ends of the work case 264a.

Furthermore, a movable anchor portion 281 for anchoring the closed port side of the lowermost work case 164b is rotatably disposed by a shaft 282 on the mechanism main body 263 below the right rotary member 272, and is rotated by an air cylinder 284 through a lever 283 that projects from the shaft 282 described above. A fixed anchor portion 285 is disposed below the left rotary member 271 in order to anchor the left side of the lowermost work case 264b.

Six lines of work insertion guide grooves 287 are disposed into which the works W extracted from the fixture by the work adsorption nozzles 286 of the work transfer mechanism and to correspond to the work insertion port 267 of the lowermost work case 264b, and a work push member 288 that is retractile with respect to the insertion port 267 of the work case 264b is disposed in the six lines of work insertion guide groove 287. The piston rod of an air cylinder 289 fixed on a fitting bed 290 is connected to the push member 288. This push member 288 consists of six combteeth corresponding to the six lines of work insertion guide grooves 287.

When the rotary members 271 and 272 on both sides open and the anchor pawls 278 and 279 on both sides come off from the empty work case 264a, the movable anchor portion 281 is under the horizontally rotated state and anchors the work case dropping to the position represented by reference numeral 264b in cooperation with the fixed anchor portion 285. Since another work case drops at the same time from above to a position represented by reference numeral 264a, the anchor pawls 278 and 279 anchor this falling work case. After the works W are transferred from the fixture 51 into the work insertion guide grooves 287, the push member 288 is moved forth by the air cylinder 289 and the works W are pushed into the insertion port 267 of the work case 264b. Such operations are repeated until all the works are loaded fully into the work case 264b, the movable anchor portion 281 is rotated downward. In this instance, though the work case is temporarily fixed on its insertion port side to the fixed anchor portion 285 as represented by reference numeral 264c, this anchor operation is immediately released and the work case drops into the work case storage portion 291 disposed therebelow. This storage portion 291 is inclined lest the works come out from the work insertion port of the work case.

As described above, this unloading unit 16 can automatically recover the works W inside the fixture 51 into the empty work case 264.

Next, the overall operation of this automatic soldering apparatus will be described briefly.

The fixture 51 which becomes empty at the unloading unit 16 is put on the take-in conveyor 101 of the loading unit 11 through the return conveyor 22 of each of the units 15, 14, 13 and 12 and transferred to the position above the fixture support bed 102 that is waiting at the descending position. This fixture 51 is located onto the support bed 102 by the elevation of the support bed 102 by the elevation mechanism 103, the work support frame 71 is opened by the support frame opening/closing mechanism 104 at the elevation stop position and the six work receiving beds 61 of each line of the fixture 51 are sequentially positioned immediately below the six work adsorption nozzles 171 by the pitch-feed operation (intermittent feed) of the support bed 102 by the feed screw 124. The six work adsorption nozzles 171 transfer the works W thus picked up by vacuum adsorption from the six work supply positions 106 to the work fitting grooves 63 or 64 of each work receiving bed 61. After the works W are fitted to all the work receiving beds 61, the work support frame 71 of the fixture 51 is closed by the support frame opening/closing mechanism 104 and the works W are fixed. This fixture is then reversed by the reversing mechanism 109 so that the works W are positioned on the lower side, and is conveyed to the soldering conveyor 21 of each of the units 12 to 15. The leads L of each work W are then soldered on each soldering line. Finally, the fixture 51 is reversed by the unloading unit 16, the work support frame 71 is opened and after the works W are recovered into the empty work case 264 by the vacuum adsorption nozzles 286 and the like with the pitch-feed operation, the work support frame 71 is closed, lowered and taken out to the return conveyor 22.

Incidentally, the present invention is not particularly limited to the integrated circuit devices (ICs) as the work W, but can be used for soldering of other works (such as printed circuit boards).

[Effect of the Invention]

The invention of this application includes the loading unit in which the works are fitted to the fixture, a plurality of units relating to the solder operation and the unloading unit which recovers the works from the fixture, and all these units are disposed sequentially and separately. The units relating to the solder operation are equipped respectively with the soldering conveyor on the same level for conveying the fixture to which the works are fitted, and with the return conveyor on the same level for conveying the fixture from which the works have been removed. Therefore, each of these units relating to the solder operation has a fixture conveying function of its own as well as compatibility with the conveying function of the other units. For these reason, these units can be combined arbitrarily between the loading unit and the unloading unit, whenever necessary. Since these units can be removed, added and changed freely, it is possible to accomplish a flexible manufacturing system and to cope with the requirement for production of many kinds of products in limited quantities.

In the fixture in accordance with the invention of the present application, the work support frame positioned downstream of the outer frame grid can be opened and closed freely at the time of soldering with the hinge as the integral part of the outer frame being the center with respect to the outer frame equipped integrally with the work receiving beds that are positioned upstream of the work at the time of soldering, and anchor means are disposed at the positions of the outer frame on the opposite side to the hinge and at the corresponding positions of the work support frame in such a manner as to mesh with one another. Therefore, the fixture is reversed at the time of fitting and recovery of the works in such a manner that the work support frame is positioned upstream of the outer frame grid, and the work support frame located by the hinge can be easily opened and closed by an external automatic device. Accordingly, this fixture can cope with automation of the work fitting and recovery operations. Furthermore, since the work support metals for pushing and fixing from below the works, that are fitted to the work receiving beds, at the time of soldering are disposed on the work support frame, the support metals can support an arbitrary one point of the lower surface of each work so that the obstacle for the molten solder becomes minimal and the work can be soldered reliably.

In accordance with the invention of the present application, the loading unit and the unloading units are disposed as part of the endless conveyor line of the fixture between the soldering conveyor and the return conveyor, and the loading unit is an automatic apparatus equipped with the support frame opening/closing mechanism, the work supply mechanism, the work transfer mechanism and the fixture reversing mechanism. Therefore, the loading unit can automatically fit the works to the fixture that is conveyed endlessly.

Furthermore, the fixture is turned upside down at the time of the work fitting and recovery operation with its state at the time of soldering as the reference, and the work support frame is positioned upstream of the work receiving bed positioned on the grid inside the outer frame reversed downard, and is opened up. Since the works are transferred from the work supply position to the work receiving beds of the fixture by the work adsorption nozzles of the work transfer mechanism, it becomes possible to fit those works which cannot be applied to a slide fitting system, such as the surface mount type integrated circuit devices, to the fixture by the pick-and-place system.

What is claimed is:

1. An automatic soldering apparatus for automatically soldering a plurality of works fitted to a fixture while being conveyed by a soldering conveyor, said automatic soldering apparatus including:

a loading unit for fitting works to a fixture;

a soldering conveyor unit for conveying said fixture to which said works are fitted;

an unloading unit for removing said works from said fixture; and a return conveyor unit for conveying said fixture from which said works are removed;

each of said units being arranged to endlessly convey said fixtures; wherein a plurality of work receiving beds are disposed integrally on a grid inside an outer frame of said fixture;

a work support frame is disposed on said outer frame in such a manner as to be capable of being opened and closed with a hinge as an integral part on one side of said outer frame being the center;

said fixture is turned upside down at the time of fitting and removal of said works with its state at the time of soldering being the reference;

said work support frame is positioned above said work receiving beds positioned above said grid inside said outer frame which is reversed downward, and is opened upward; and said loading unit consists of a fixture support bed onto which said fixture, carried in from said return conveyor is transferred; a support frame opening/closing mechanism for opening and closing said work support frame of said fixture which is located onto said fixture support bed; a work case supply mechanism for removing said individual works from a work case which stores therein a large number of said works and transferring the removed works to a work supply position; a work transfer mechanism for transferring said works to said work receiving beds of said fixture whose work support frame is opened, from said work supply position by work adsorption nozzles; and a fixture reversing mechanism for turning upside down said fixture whose work support frame is closed by said support frame opening/closing mechanism and supplying it to said soldering conveyor.

2. The automatic soldering apparatus as defined in claim 1, wherein said fixture support bed is moved by intervals equal to the spacing of the work receiving beds of said fixture into position for the transfer of said works, and said work transfer mechanism transfers a plurality of said works from a plurality of work supply positions to a plurality of said work receiving beds that have been so moved and positioned by a work adsorption nozzle.

3. The automatic soldering apparatus as defined in claim 1, wherein said work supply mechanism consists of a work case stock portion where a large number of said work cases are stacked for descent, each of said work cases having a closed side and an opposite side containing a port through which work is taken out; an anchor portion for anchoring the closed side of the lowermost work case; an arcuate guide surface for guiding descension of a work take-out port positioned on the opposite side of said work case anchored by said anchor portion and allowing said opposite side containing said port to descend to place said work case in an inclined position; and work extraction members retractably disposed at said port of said work case that is inclined due to descension of one of its sides along said arcuate guide surface, for extracting and moving said work to a work supply position.

4. The automatic soldering apparatus as defined in claim 3, wherein each of said work extraction members is equipped with work fitting grooves which have a V-shaped sectional shape and into which said works dropping from said port of said inclined work case are fitted, said work supply position has a work receiving surface for horizontally supporting said work pushed out from said work fitting groove due to the extraction operation of said work extraction member, and work anchor pawls having a work anchor portion disposed at a fixed position and operative to clamp said work to said work receiving surface.

5. The automatic soldering apparatus as defined in claim 1, wherein said unloading unit is constructed in substantially the same way as said work loading unit except for a work recovery mechanism corresponding to said work case supply mechanism, turns upside down said fixture carried in from said soldering conveyor, opens said work support frame above said fixture, takes out said work on said work receiving bed by said work adsorption nozzles, closes said work support frame and conveys said fixture to said return conveyor.

6. The automatic soldering apparatus as defined in claim 5, wherein said work recovery mechanism of said unloading unit consists of an empty case stock where a large number of empty work cases are stacked, a work insertion guide groove which is disposed on the work insertion port side of said empty work case at the lowermost position and to which said work taken out from said fixture by said work adsorption nozzles is transferred, and a work push member disposed retractably with respect to said work insertion port of said work case inside said work insertion guide groove.

* * * * *